Aug. 13, 1940. C. H. TRAVER 2,211,035
DRAFT DEFLECTOR
Filed June 7, 1935
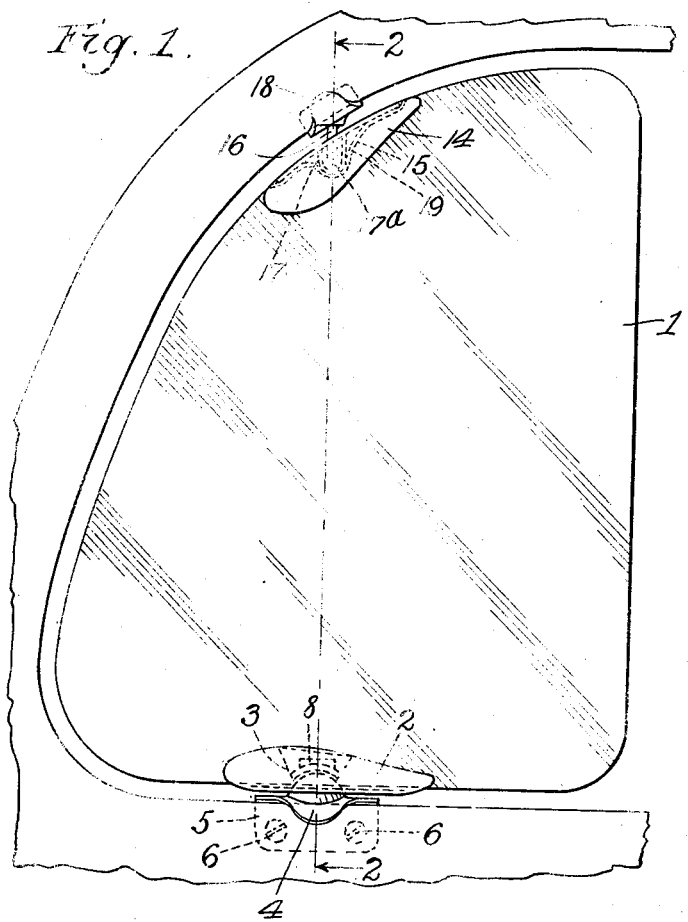
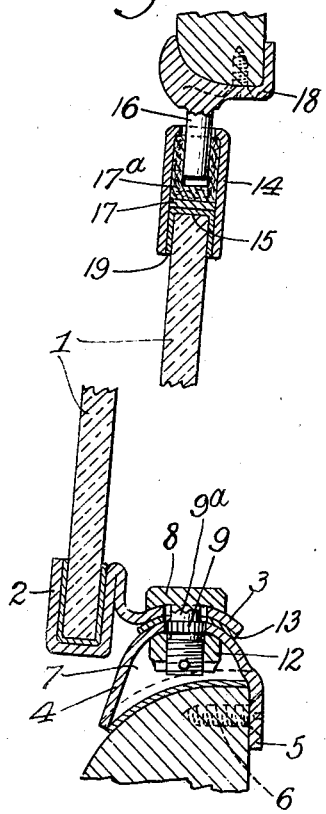
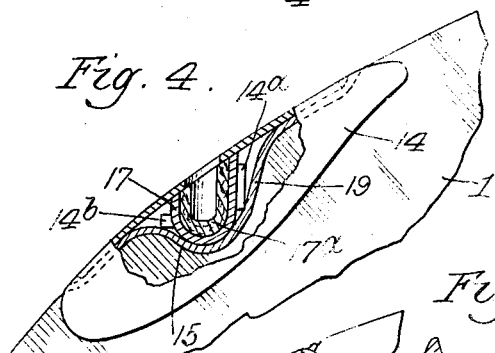
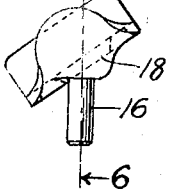
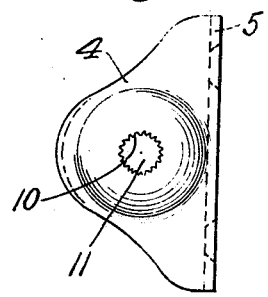
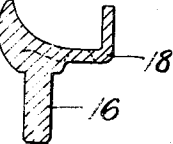
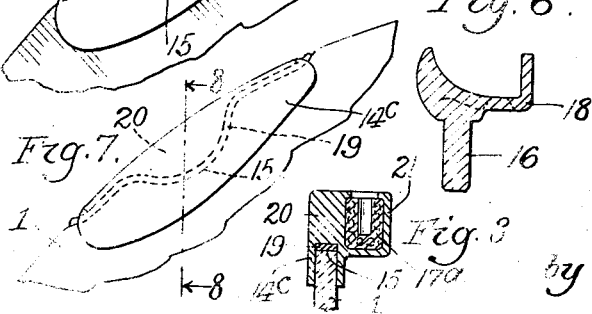
Inventor
Clarence H. Traver
by Parker & Carter
Attorneys.

Patented Aug. 13, 1940

2,211,035

UNITED STATES PATENT OFFICE 2,211,035

DRAFT DEFLECTOR

Clarence H. Traver, Chicago, Ill., assignor to The Dole Valve Company, Chicago, Ill., a corporation of Illinois Application June 7, 1935, Serial No. 25,356

10 Claims. (Cl. 296—84)

This invention relates to draft deflectors and has an object to provide a new and improved device of this description.

The invention has as a further object to provide a draft deflector which is cheap in construction and easy in operation.

The invention has as a further object to provide a draft deflector which can be easily and quickly attached to the reveals of the window of the vehicle, in connection with which it is used.

The invention has further objects which will be more particularly pointed out in the accompanying description.

Referring now to the drawing, Fig. 1 is a side elevation showing one form of draft deflector embodying the invention;

Fig. 2 is a sectional view taken on line 2—2 of Fig. 1;

Fig. 3 is a plan view of the lower reveal engaging member;

Fig. 4 is a view in part section, showing the method of connecting the upper reveal engaging member with the glass;

Fig. 5 is a view of the upper pivot member;

Fig. 6 is a sectional view taken on line 6—6 of Fig. 5.

Fig. 7 is a view with parts broken away showing a modified construction; and

Fig. 8 is a side view of the device shown in Fig. 7.

Like numerals refer to like parts throughout the several figures.

In connection with the invention there is provided a glass deflector member 1, which is connected in position in the window of the automobile and to the reveals thereof. In the particular construction illustrated there is connected to the deflector member 1 a lower bracket 2, which may be of any desired form. As herein shown, it consists of a grooved member into which the glass is received, this member having a laterally projecting part 3 preferably integral therewith. There is a lower reveal engaging member 4 which engages the reveal and which has a projecting part 5, which projects along a vertical surface of the reveal and is attached thereto by the fastening device 6. This lower reveal engaging member 4 engages the reveal at its edges and projects a distance from the reveal, between its edges, so as to form the space 7 between the engaging member 4 and the reveal. The lower bracket 2 is connected with this engaging member 4 by means of a fastening member 8, which passes through an opening in the laterally extending part 3 and in the reveal engaging member 4, and which has a low flat head which projects only a short distance above the laterally extending part 3. The fastening member 8 is provided with a means for connecting it with the reveal engaging member 4, so as to prevent its rotation. In the construction shown the fastening member 8 is provided with a series of separated projections 9 which fit in between a series of projections 10 in the opening 11 in the reveal engaging member 4, into which the fastening device is received. The part 9 of the fastening device 8 is preferably larger in diameter than the part 9a which passes through the reveal engaging member 4 and is also larger than the threaded end portion. The opening in the laterally extending member 3 is larger in diameter than the diameter of the part 9a of the fastening device 8 so that there is a certain amount of play when the parts are in position. The fastening device is provided at its ends with threads and there is a nut 12 which engages the threads and which is located in the receiving space 7 in the reveal engaging member 4. It will be seen that when the fastening member 8 is placed in position, as shown in Fig. 2, the knurled portion fits into the serrated opening 11 and this prevents the fastening member from turning.

A friction member 13 is preferably placed between the laterally extending part 3 and the reveal engaging member 4. The nut 12 is then tightened up, the knurls and serrations preventing the turning of the fastening member during this operation. The knurled and serrated engagement acts so as to prevent the fastening member from turning when the draft deflector is moved to different angular positions and also acts as a lock nut.

The construction herein shown provides a self-aligning device and also provides for variations in the reveal, which variations frequently occur. It also provides for an extra amount of axial alignment.

It will further be seen that the nut is concealed under the reveal engaging member so that when tightened up to the proper degree, before the draft deflector is attached to the reveals, it is concealed and out of sight when the draft deflector is in position on the reveals and cannot be tampered with.

The upper end of the deflector member 1 is provided with a bracket 14 and the glass of the deflector member 1 is cut away, as shown at 15, and the lower end of the upper pivot member 16 fits into this opening, there being preferably a receiving part 17 rigidly connected to the bracket 14 by means of the members 14a and 14b and in this receiving part is a bushing 17a of non-metallic material which separates the metal of the pivot from the metal of the socket and the glass and which also acts as an elastic and noiseless connection.

This construction provides a means for preventing the glass from being pulled out of the bracket for if pressure is put upon the glass in any direction, it is taken care of by the construction herein shown. The lateral pressures, for example, are taken care of by the members 14a, 14b and 17 which are attached to the bracket 14, such bracket having side members which project downwardly along the opposite sides of the glass so as to prevent movement of the bracket with relation to the glass, see Figs. 1 and 2. It will thus be seen in whatever direction pressure is applied to the glass 1, there will be no tendency to disconnect it from the bracket 14. The pivot member 16 fits into the bushing 17a and is in alignment with the glass deflector member 1, the axis of the pivot being in line with the center line of the glass. The pivot member 16 has a reveal engaging member 18 which engages the upper reveal.

In Figs. 7 and 8, there is shown a modified construction wherein the glass deflector member is provided with a cut away portion at the top where the bracket 14c is received. Along the edge of the glass is a non-metallic member 19. The hollow space in the glass is then filled up with a member 20 which is preferably metal. In this construction, the bracket has a laterally projecting piece 21 into which the pivot 16 is received. This construction also prevents the glass from being pulled out of the bracket 14c.

It will be seen that the lower reveal engaging member 4, friction device 13, and the projection 5 on the bracket and the under face of the enlarged end of the fastening member 8, which it engages, are all spherical shaped.

I have described in detail a particular construction embodying my invention, but it is of course evident that the parts may be varied in many particulars without departing from the spirit of the invention as embodied in the claims hereto appended, and I therefore do not limit myself to the particular construction shown.

The use and operation of my invention are as follows:

In assembling the device, the lower and upper brackets 2 and 14 are attached to the deflector member 1 and the reveal engaging member 4, the fastening member 7 and associated parts are connected together, and the nut 12 tightened. The upper pivot member 16 is placed in position and the reveal engaging members 4 and 18 are then attached to the reveals. When it is desired to move the deflector to angular positions it is grasped by the hand and pressure applied thereto, and it rotates or rocks about the pivot member 16 and the fastening member 8. The friction member 13 resists this movement and acts to hold the deflector member in any position into which it is moved.

The construction of the upper bracket and associated parts, wherein the deflector member is inserted in a groove in it, the bracket extending on both sides of the glass and having a central opening in it for the pivot member 16, there being a slot or opening in the glass for this pivot member, insure the upper bracket staying in position when pressure is applied to the deflector member 1 to turn it to different angular positions, the parts being arranged so that the glass cannot be displaced on the bracket either by excessive hand pressure, road shock or door slamming. This construction also prevents the glass from being pulled out of the bracket when pressure is applied to rotate it on its pivot.

The lower bracket assembly is such that a large part of the pivotal means, including the nut and lower end of the fastening member 8, is concealed and out of the way and inaccessible and the fastening member 8 is insured against turning when the deflector member 1 is turned to various angular positions.

It will further be seen that there is here provided a simple, cheap and efficient draft deflector which can be easily and quickly placed in position in the window of the automobile, and which can be easily turned to various angular positions as desired.

I claim:

1. A draft deflector comprising a draft deflector member, a bracket at the lower edge thereof, having a laterally extending part which forms a support for the lower end of the deflector member, a reveal engaging member which extends upwardly above the reveal, between its edges, so as to form a receiving space between it and the reveal, a fastening member extending through the laterally extending part and the reveal engaging member, said laterally extending part being movable with relation to said fastening member, a friction device between said laterally projecting part and the reveal engaging member, a nut having a threaded engagement with the lower end of the fastening member and located within the receiving space under the reveal engaging member, whereby the adjusting device for the friction device is concealed so that it cannot be tampered with when the deflector is in position, and means associated with said friction device for preventing the fastening member from rotating when the deflector member is moved to various angular positions.

2. A draft deflector comprising a draft deflector member, a bracket at the lower edge thereof, having a laterally extending part which forms a support for the lower end of the deflector member, a reveal engaging member which extends upwardly above the reveal, between its edges, so as to form a receiving space beneath it and between it and the reveal, a fastening member extending through the laterally extending part and the reveal engaging member, said laterally extending part being movable with relation to said fastening member, a friction device between said laterally extending part and the reveal engaging member, a nut having a threaded engagement with the lower end of the fastening member and located within the receiving space under the reveal engaging member, whereby the adjusting device for the friction device is concealed so that it cannot be tampered with when the deflector is in position, and means associated with said friction device for preventing the fastening member from rotating when the deflector member is moved to various angular positions, an upper pivot connected with said deflector member being inclined with relation to the vertical.

3. A draft deflector comprising a draft deflector member, a bracket at the lower edge thereof, having a laterally extending part which forms a support for the lower end of the deflector member, a reveal engaging member which extends upwardly above the reveal, between its edges, so as to form a receiving space beneath it and between it and the reveal, a fastening member extending through the laterally extending part and the reveal engaging member, said laterally extending part being movable with relation to said fastening member, a friction device between said laterally extending part and the reveal engaging member, a nut having a threaded engagement with the lower end of the fastening member and located within the receiving space under the reveal engaging member, whereby the adjusting device for the friction device is concealed so that it cannot be tampered with when the deflector is in position, co-operating projections on the fastening member and the reveal engaging member which prevent the rotation of the fastening member when the deflector member is moved to various angular positions.

4. A draft deflector comprising a draft deflector member, a bracket at the lower edge thereof, having a laterally extending part which forms a support for the lower end of the deflector member, a reveal engaging member which extends upwardly above the reveal, between its edges, so as to form a receiving space beneath it and the reveal, a fastening member extending through the laterally extending part and the reveal engaging member, said laterally extending part being movable with relation to said fastening member, a friction device between said laterally extending part and the reveal engaging member, a nut having a threaded engagement with the lower end of the fastening member and located within the receiving space under the reveal engaging member, whereby the adjusting device for the friction device is concealed so that it cannot be tampered with when the deflector is in position, and means associated with said friction device for preventing the fastening member from rotating when the deflector member is moved to various angular positions, the reveal engaging member, friction device, and the projections on the bracket and the under face of the enlarged end of the fastening member which it engages all being spherical shaped.

5. A draft deflector comprising a draft deflector member, a bracket at the lower edge thereof, having a laterally extending part which forms a support for the lower end of the deflector member, a reveal engaging member which extends upwardly above the reveal, between its edges, so as to form a receiving space between it and the reveal, a fastening member, extending through the laterally extending part and the reveal engaging member, said laterally extending part being movable with relation to said fastening member, having an enlarged head which engages the laterally extending part, a nut engaging the end of the fastening member and located in the receiving space between the reveal and the reveal engaging member, whereby the adjusting device for the friction device is concealed so that it cannot be tampered with when the deflector is in position, a fastening means for fastening the reveal engaging member to the reveal, the engaging faces of said head and the laterally extending part and reveal engaging member being of spherical form.

6. A draft deflector comprising a deflector member, a reveal engaging member at the lower edge of said deflector member, with which the deflector member is pivotally connected, the upper edge of the deflector member having a cutaway portion, a bracket connected with said upper edge and engaging said cutaway portion, an upper reveal engaging member, a pivot connecting the bracket and the upper reveal engaging member, a portion of which is received in the space formed by the cutaway portion of the deflector section and means for preventing the glass from being pulled out of the bracket.

7. A draft deflector comprising a deflector member, a reveal engaging member at the lower edge of said deflector member, with which the deflector member is pivotally connected, the upper edge of the deflector member having a cutaway portion, a bracket connected with said upper edge and engaging said cutaway portion, an upper reveal engaging member, a pivot connected therewith, which is received in the space formed by the cutaway portion of the deflector section, and a non-metallic bushing interposed between the end of said pivot and the deflector member.

8. A draft deflector comprising a deflector member, a reveal engaging member at the lower edge of said deflector member, with which the deflector member is pivotally connected, the upper edge of the deflector member having a cutaway portion, a bracket connected with said upper edge and having a portion which projects into said cutaway portion, an upper reveal engaging member, a pivot having one end projecting into said bracket and the other end connected with said reveal engaging member, the axis of the pivot being in line with the center line of the glass deflector member.

9. A draft deflector comprising a glass deflector member, having a portion of the upper part thereof removed, a bracket connected with the glass deflector member and extending downwardly and laterally beyond the cutaway portion, a metal member in the cutaway portion of the glass deflector member and a non-metallic member between the metal member and the glass, the parts arranged to resist the pulling out of the glass from the bracket, and means for connecting a pivot with said bracket.

10. A draft deflector comprising a deflector member, a bracket at the lower edge thereof, having a laterally extending part, a reveal engaging member which extends upwardly above the reveal, between its edges, so as to form a receiving space between it and the reveal, a friction member between the laterally extending part and the reveal engaging member, a fastening member extending through the laterally projecting part, the friction member and the reveal engaging member, said fastening member having an enlargement with a series of projections thereon, the reveal engaging member having cooperating projections which fit in between the projections on the fastening member, the opening in the laterally extending part being larger in diameter than the portion of the fastening member that passes therethrough, and means located between the reveal engaging member and the reveal for tightening the fastening device so as to tightly clamp the friction member whereby the adjusting device for the friction device is concealed so that it cannot be tampered with when the deflector is in position, the enlarged opening in the laterally extending part permitting automatic adjustment between the pivot and the laterally extending part when the nut is tightened.

CLARENCE H. TRAVER.